United States Patent Office 3,577,425
Patented May 4, 1971

3,577,425
8-(1,4-BENZODIOXAN-2-YLMETHYL)-3-OXO-1-THIA-4,8-DIAZASPIRO[4.5]DECANES
Michio Nakanishi, Oita, Katsuo Arimura, Fukuoka, Hiroshi Imamura, Chiba, and Toshihiro Kobayakawa, Fukuoka, Japan, assignors to Yoshitomi Pharmaceutical Industries, Ltd., Osaka, Japan
No Drawing. Filed Dec. 10, 1968, Ser. No. 782,752
Claims priority, application Japan, Dec. 11, 1967, 42/79,638; Dec. 13, 1967, 42/80,743
Int. Cl. C07d 29/34
U.S. Cl. 260—293.4           19 Claims

ABSTRACT OF THE DISCLOSURE

Benzodioxane derivatives of the formula

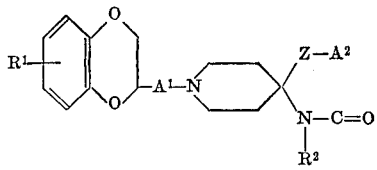

and pharmaceutically acceptable salts thereof, wherein $R^1$ is H, Cl, methyl or methoxy, $R^2$ is H, alkyl of 1 to 4 carbon atoms, benzyl, phenyl or substituted phenyl in which the substituent is selected from the group consisting of Cl, methyl methoxy and trifluoromethyl, $A^1$ is —CH$_2$—, —CH$_2$CH$_2$—, —CO— or —CH$_2$CO— the carbonyl portion of which is bound to the N atom of the piperidine ring or —CH(OH)—CH$_2$— the methylene (—CH$_2$—) portion of which is bound to the N atom of the piperidine ring, $A^2$ is —CH$_2$—, or =CHCH$_3$, and Z is —S—, —SO— or —SO$_2$—, are vasodilators of low toxicity in mammals.

---

This invention relates to novel and therapeutically valuable benzodioxane derivatives, to compositions containing said derivatives and to the method of using said derivatives.

The novel benzodioxane derivatives of the invention are of the formula:

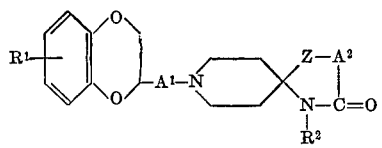

wherein $R^1$ is H, Cl, methyl or methoxy, $R^2$ is H, alkyl of 1 to 4 carbon atoms, benzyl, phenyl or substituted phenyl in which the substituent is selected from the group consisting of Cl, methyl, methoxy and trifluoromethyl, $A^1$ is —CH$_2$—, —CH$_2$CH$_2$—, —CO—,

—CH$_2$CO— the carbonyl portions of which is bound to the N atom of the piperidine ring, or —CH(OH)—CH$_2$— the methylene (—CH$_2$—) portion of which is bound to the N atom of the piperidine ring, $A^2$ is —CH$_2$—, or =CHCH$_3$, and Z is —S—, —SO— or —SO$_2$—.

The compounds of Formula I are produced by reacting a compound of the formula

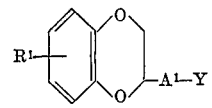

with a compound of the formula

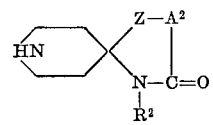

or an acid addition salt thereof, e.g. the hydrobromide, wherein Y is a reactive radical (optimally a halogen, e.g. Cl, Br or I, or reactive acid residue, e.g. methyl sulfonyloxy or p-tolylsulfonyloxy).

The starting compound (III) wherein Z is —S— is produced, for example, by the method described in Belgian Pat. No. 708,051. Oxidation of thus-produced 1-thia compound with about an equimolar amount of hydrogen peroxide in glacial acetic acid gives the corresponding sulfoxide (i.e. the compound (III) wherein Z is —SO—). The sulfone (i.e., the compound (III) whereupon Z is —SO$_2$—) is produced, for example, by further oxidation of the 1-thia compound with an excess of the oxidizing agent.

The reaction of the compound (II) with the compound (III) is carried out in a solvent inert to the reactants such as benzene, toluene and dimethylformamide, at room temperature or at an elevated temperature, e.g. about 50° C. to 200° C., optimally in the presence of a deacidifying agent. As the deacidifying agent there may be exemplified inorganic or organic alkaline or basic compounds such as sodium carbonate, potassium carbonate, pyridine and diethylaniline.

The compound of the Formula I when Z is —S— is also produced (i) by reacting a compound of the formula

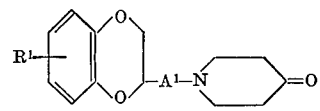

with a compound of the formula

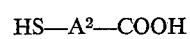

HS—A$^2$—COOH           (V)

and a compound of the formula

R$^2$NH$_2$           (VI)

or a salt thereof (e.g. ammonium carbonate), or (ii) by first reacting the compound (IV) with the compound (VI) and then reacting the resulting intermediate of the formula

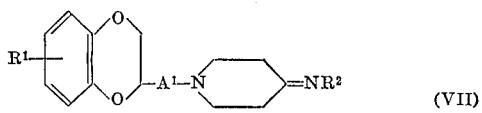

with the compound (V) (the separation of intermediate (VII) is not always necessary).

These reactions (i) and (ii) are carried out in a solvent, and are facilitated at an elevated temperature, especially at about the boiling point of the solvent employed. Most suitable solvents are aromatic hydrocarbons such as benzene, toluene and xylene which permit azeotropic removal of water formed. An acid catalyst such as p-toluene-sulfonic acid may be used.

The starting compound (IV) is produced, for example, by first reacting a compound of the formula

with a compound of the formula

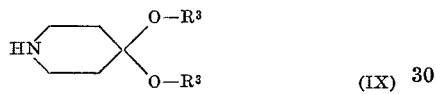

wherein $R^3$ is lower alkyl (e.g. ethyl) or two $R^3$ combinedly form alkylene (e.g. ethylene), and then hydrolyzing the resulting acetal of the formula

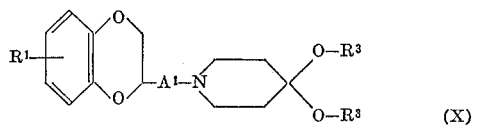

Specific example is given as follows:

A mixture of 18 g. of 1,4-benzodioxan-2-ylmethyl methanesulfonate, 16 g. of 4,4-diethoxypiperidine, 15 g. of anhydrous sodium carbonate and 350 ml. of methyl ethyl ketone is heated under reflux for 15 hours. After cooling, the reaction mixture is filtered to remove insoluble matter and the filtrate is concentrated in vacuo. To the brown residue is added 280 ml. of 5% hydrochloric acid solution and the whole is heated under reflux for 1.5 hours, and then 100 ml. of ethyl acetate is added. The separated water layer is made alkaline with sodium hydroxide and the separated oil is extracted four times with 200 ml. of ethyl acetate. The extract layer is washed with saturated sodium chloride solution, and dried over sodium sulfate, and concentrated in vacuo to leave 15 g. of 2-(4-oxo-piperidinomethyl)-1,4-benzodioxane as a yellow-brown solid. This is recrystallized from isopropanol to become yellowish white crystals melting at 92° to 93° C.

The benzodioxane derivatives of Formula I can form acid addition salts with various inorganic or organic acids such as hydrochloric, hydrobromic, sulfuric, nitric, oxalic, maleic, fumaric, tartaric, malonic acid and so on. For purposes of the instant invention, the acid addition salts are the full equivalents of the Formula I compounds.

The benzodioxane derivatives of Formula I as well as their pharmaceutically acceptable acid addition salts, in animal test, increase femoral blood flow as shown by the following test:

The femoral blood flow was measured by Ohashi-Yago's method (N. Yago: Foria Pharmacologica Japonica, vol. 57, p. 380 (1961)) using the secobarbital anesthetized dog (male adult), the test compound being administered intravenously.

TABLE 1

| Test compound: | Dose (mcg./kg.) | Increase, percent | Duration (sec.) | $ED_{50}$ (mcg./kg.) |
|---|---|---|---|---|
| A | 2.5 | 15 | 110 | |
|   | 5 | 56 | 140 | 4.3 |
|   | 10 | 204 | 180 | |
|   | 25 | 421 | 170 | |
| B | 2.5 | 18 | 100 | |
|   | 5 | 56 | 100 | 5.6 |
|   | 10 | 64 | 110 | |
|   | 25 | 157 | 130 | |
| C | 10 | 41 | 110 | |
|   | 25 | 128 | 105 | 10 |
|   | 50 | 176 | 120 | |
| D | 10 | 31 | 110 | |
|   | 25 | 125 | 165 | 13 |
|   | 50 | 228 | 230 | |
|   | 100 | 202 | 150 | |
| E | 5 | 19 | 110 | |
|   | 10 | 20 | 95 | 13 |
|   | 25 | 108 | 160 | |
|   | 50 | 129 | 125 | |
| F | 25 | 43 | 135 | |
|   | 50 | 116 | 130 | 25 |
|   | 100 | 156 | 150 | |
| G | 10 | 67 | 130 | |
|   | 25 | 106 | 120 | |
|   | 50 | 180 | 115 | 6 |
|   | 100 | 438 | 140 | |
| H | 10 | 25 | 115 | |
|   | 25 | 25 | 135 | 41 |
|   | 50 | 94 | 115 | |
|   | 100 | 108 | 95 | |

Remarks:
A—8-(1,4-benzodioxan-2-ylmethyl)-3-oxo-1-thia-4,8-diazaspiro(4.5) decane hydrogen maleate.
B—8-(1,4-benzodioxan-2-ylmethyl)-4-ethyl-3-oxo-1-thia-4,8-diazaspiro(4.5)decane hydrochloride.
C—8-(2-(1,4-benzodioxan-2-yl)ethyl)-3-oxo-1-thia-4,8-diazaspiro(4.5) decane hydrogen maleate.
D—8-(1,4-benzodioxan-2-ylmethyl)-2-methyl-3-oxo-4-phenyl-1-thia-4,8-diazaspiro(4.5)decane hydrogen maleate.
E—8-(2-(1,4-benzodioxan-2-yl)ethyl)-4-methyl-3-oxo-1-thia-4,8-diazaspiro(4.5)decane hydrochloride.
F—8-(1,4-benzodioxan-2-ylmethyl)-2-methyl-3-oxo-1-thia-4,8-diazaspiro(4.5)decane hydrogen maleate.
G—8-(1,4-benzodioxan-2-ylmethyl)-3-oxo-4-p-tolyl-1-thia-4,8-diazaspiro(4.5)decane hydrochloride containing ½ molecule of water of crystallization.
H—8-(1,4-benzodioxan-2-ylmethyl)-4-methyl-3-oxo-1-thia-4,8-diazaspiro(4.5)decane hydrochloride.

The acute toxicity of 8-(1,4-benzodioxan-2-ylmethyl)-3-oxo-1-thia-4,8-diazaspiro(4.5)decane hydrogen maleate measured by Litchfield-Wilcoxon method (The Journal of Pharmacology and Experimental Therapeutics, vol. 96, p. 99 (1949)), is as follows:

TABLE 2

| | $LD_{50}$ (mg./kg.) | | | |
|---|---|---|---|---|
| | Wistar rat | | D.d. mouse | |
| Route | Male | Female | Male | Female |
| Oral | 5,500 | 5,200 | 3,700 | 3,400 |
| Subcutaneous | 5,400 | 4,800 | 2,100 | 1,900 |
| Intraperitoneal | 1,100 | 1,050 | 650 | 560 |

The compounds (I) of the invention and pharmaceutically acceptable acid addition salts thereof are useful, for example, as vasodilators, especially for the treatment of peripheral vascular disturbances, in the form of pharmaceutical composition in admixture with a suitable and conventional carrier or adjuvant, administrable orally or by way of injection, without giving harm to the host.

The pharmaceutical composition may take the form of tablets, granules, powder, syrup or injectable solution and may be administered parenterally or orally, usual daily doses of active ingredient (I), or salt thereof, lying in the range of 30 to 150 milligrams per human adult.

The choice of carriers is determined by the preferred form of administration, the solubility of the compounds and standard pharmaceutical practice. The following are the examples of the formulae to be taken when the compound (I) of the present invention is administered for the pharmaceutical purposes.

(A) 10 mg. tablet:  Mg.
    Compound (I) _____ 10
    Lactose _____ 70
    Starch _____ 19
    Magnesium stearate _____ 1

(B) 0.1% injection: Mg.
  Compound (I) _____ 5
  Sodium chloride _____ 45
  Water for injection, a sufficient quantity to make 5 milliliters.

In the following illustrative examples, parts by weight bear the same relation to parts by volume as do grams to milliliters.

EXAMPLE 1

To a suspension of 10.1 parts by weight of 3-oxo-1-thia-4,8-diazaspiro(4.5)decane hydrobromide and 12 parts by weight of sodium carbonate in 300 parts by volume of dimethylformamide is added 10.7 parts by weight of 1,4-benzodioxan-2-ylmethyl p-toluenesulfonate, and the mixture is heated at 90° to 100° C. for 18 hours with stirring. The reaction mixture is filtered to remove insoluble matter, and the filtrate is concentrated to about one fourth of its original volume in vacuo, and 300 parts by volume of chloroform and 80 parts by volume of water are added thereto under ice-cooling. The chloroform layer is washed with 80 parts by volume of water, dried over sodium sulfate, and concentrated in vacuo. To the red-brown residue is added 30 parts by volume of isopropanol, and the whole is filtered. Thus obtained 8.5 parts by weight of yellowish white crystals is suspended in 100 parts by volume of chloroform and 300 parts by volume of acetone and a solution of 3.1 parts by weight of maleic acid in 40 parts by volume of acetone is added thereto to yield white crystals, which are recrystallized from methanol to give 8.2 parts by weight of 8-(1,4-benzodioxan-2-ylmethyl)-3-oxo-1-thia 4,8-diazaspiro(4.5)decane hydrogen maleate melting at 195° to 196° C. with decomposition.

EXAMPLE 2

To a suspension of 26.7 parts by weight of 4-methyl-3-oxo-1-thia-4,8-diazaspiro(4.5)decane hydrobromide and 28 parts by weight of potassium carbonate in 400 parts by volume of dimethylformamide is added 22.9 parts by weight of 2-bromomethyl-1,4-benzodioxane, and the mixture is heated at 100° to 110° C. for 8 hours with stirring. The reaction mixture is filtered to remove insoluble matter, and the filtrate is concentrated to about one fourth of its original volume in vacuo, and 600 parts by volume of chloroform and 150 parts by volume of water are added thereto under ice-cooling. The chloroform layer is washed with 150 parts by volume of water, dried over sodium sulfate, and concentrated in vacuo. To the red-brown residue is added 30 parts by volume of ethanol, and the whole is filtered. Thus obtained yellowish white crystals are recrystallized from isopropanol to give 14 parts by weight of white crystalline 8-(1,4-benzodioxan-2-ylmethyl)-4-methyl-3 - oxo - 1 - thia-4,8 - diazaspiro(4.5) decane melting at 140° C.

EXAMPLE 3

To a solution of 13.1 parts by weight of 2-methyl-3-oxo-4-phenyl-1-thia-4,8-diazaspiro(4.5)decane and 10 parts by weight of triethylamine in 300 parts by volume of toluene is added a solution of 13.0 parts by weight of 1,4-benzodioxane-2-carbonyl chloride in 100 parts by volume of toluene, and the mixture heated under reflux for 13 hours with stirring. After cooling, 100 parts by volume of toluene is added and the whole is washed in sequence with water, diluted hydrochloric acid solution, diluted sodium hydrogen carbonate solution and water. The toluene solution is dried over sodium sulfate and concentrated in vacuo to leave a yellow-brown oil, which is dissolved in 30 parts by volume of ethanol under heating. After cooling, additional 30 parts by volume of ethanol is added thereto. The precipitated white crystals are collected by filtration and recrystallized from ethanol to give 8.7 parts by weight of 8 - (1,4 - benzodioxan-2-ylcarbonyl)-2-methyl-3-oxo-4-phenyl - 4,8 - diazaspiro(4.5)decane melting at 155° to 157° C.

EXAMPLE 4

A mixture of 6.3 parts by weight of 3-oxo-4-m-trifluoromethylphenyl-1-thia-4,8-diazaspiro(4.5)decane, 6.4 parts by weight of 1,4-benzodioxan-2-ylmethyl p-toluenesulfonate, 4 parts by weight of sodium carbonate and 250 parts by volume of dimethylformamide is heated at 80° to 90° C. for 22 hours with stirring. After cooling, about 150 parts by volume of ice water is added to the reaction mixture and the separated oil layer is extracted with three 100 parts by volume portions of ethyl acetate. The combined extract layer is washed with two 50 parts by volume portions of water, and then extracted with 200 parts by volume of 5% hydrochloric acid solution. The aqueous extract layer is made alkaline with 5% sodium hydroxide solution, and the separated red-brown oil is extracted with three 100 parts by volume portions of ethyl acetate. The combined extract is washed with two 50 parts by volume portions of water, dried over sodium sulfate, and concentrated in vacuo to leave a red-brown oil (10.3 parts by weight). This oil is dissolved in 70 parts by volume of acetone, and a solution of 3 parts by weight of maleic acid in 30 parts by volume of acetone is added thereto. The precipitated yellowish white crystals are collected by filtration and recrystallized from ethanol to give 5.6 parts by weight of white crystalline 8-(1,4-benzodioxan-2-ylmethyl) - 3 - oxo - 4-m-trifluoromethylphenyl-1-thia-4,8-diazaspiro(4.5)decane hydrogen maleate melting at 217° to 218° C. with decomposition.

EXAMPLE 5

To a suspension of 24.7 parts by weight of 3-oxo-1-thia-4,8-diazaspiro(4.5)decane hydrobromide and 25 parts by weight of sodium carbonate in 200 parts by volume of dimethylformamide is added 17.8 parts by weight of 8-methoxy-1,4-benzodioxan - 2 - ylmethyl methanesulfonate, and the mixture is heated at 95° to 100° C. for 13 hours with stirring, and then treated as in Example 2 to give yellowish white crystals, which are recrystallized from isopropanol-ethyl acetate (3:1) to give 7.8 parts by weight of white crystalline 8-(8-methoxy-1,4-benzodioxan-2-ylmethyl) - 3 - oxo-1-thia-4,8-diazaspiro(4.5)decane melting at 207° to 210° C.

EXAMPLE 6

A solution of 4.95 parts by weight of 2-(4-oxopiperidinomethyl-1,4-benzodioxane, 2.23 parts by weight of aniline, 0.05 part by weight of p-toluenesulfonic acid in 200 parts by volume of toluene is heated under reflux with stirring for 10 hours in a flask connected with a water-removing adapter. After cooling to room temperature, 2.54 parts by weight of 2-mercaptopropionic acid is added, and the whole is heated under reflux for further 8 hours with stirring. After cooling, the reaction mixture is washed with 5% sodium hydrogen carbonate solution and then with water, dried over sodium sulfate, and concentrated in vacuo. The brown residue is recrystallized twice from isopropanol to give 4.5 parts by weight of white crystalline 8 - (1,4 - benzodioxan - 2-ylmethyl)-2-methyl - 3 - oxo - 4 - phenyl-1-thia-4,8-diazaspiro-(4.5) decane melting at 153° to 155° C.

Its hydrogen oxalate melts at 218° to 219° C. with decomposition.

EXAMPLE 7

A solution of 6.7 parts by weight of 2-(4-benzyliminopiperidinomethyl)-1,4-benzodioxane, 2.0 parts by weight of thioglycolic acid and 0.05 part by weight of p-toluenesulfonic acid in 200 parts by volume of toluene is heated under reflux with stirring for 15 hours in a flask connected with a water-removing adapter. The reaction mixture is treated as in Example 6 to leave a red-brown oily residue (5.2 parts by weight). The residue is dissolved in 80 parts by volume of acetone, and a solution of 1.4 part by weight of maleic acid in 25 parts by volume of acetone is added thereto. The acetone solution is allowed to stand overnight to precipitate white crystals, which are collected by filtration and recrystallized from ethanol to give 4.4 parts by weight of 8 - (1,4 - benzodioxan - 2 - ylmethyl) - 4 - benzyl - 3 - oxo-1-thia-4,8-diazaspiro(4.5) decane hydrogen maleate melting at 167° to 168° C. with decomposition.

EXAMPLE 8

A mixture of 14.5 parts by weight of 2-(4-oxo-piperidinomethyl)-1,4-benzodioxane, 7.5 parts by weight of 2-mercaptopropionic acid, 6.8 parts by weight of ammonium carbonate and 400 parts by volume of benzene is heated under reflux with stirring for 18 hours in a flask connected with a water-removing adapter. The reaction mixture is treated as in Example 6 to leave a yellowish white residue. The residue is put into 50 parts by volume of isopropanol and the yellowish white crystals are collected by filtration and recrystallized from ethanol to give 14 parts by weight of white crystalline 8-(1,4-benzodioxan-2-ylmethyl)-2-methyl-3-oxo-1-thia-4,8-diazaspiro(4.5)decane melting at 188° to 190° C.

Its hydrogen maleate melts at 190° to 191° C.

In the same manner as in the above examples, the following benzodioxane derivatives are also produced:

(9) 8 - (1,4-benzodioxan-2-ylmethyl)-3-oxo-4-p-tolyl-1-thia-4,8-diazaspiro(4.5)decane containing ½ molecule of water of crystallization melting at 220° to 222° C., and its hydrochloride containing ½ molecule of water of crystallization melting at 263° to 270° C.;

(10) 8-(1,4-benzodioxan-2-ylmethyl)-3-oxo-1-thia-4,8-diazaspiro(4.5)decane 1-oxide melting at 177° to 179° C.;

(11) 8 - (1,4 - benzodioxan-2-ylmethyl)-4-p-methoxyphenyl-3-oxo-1-thia-4,8-diazaspiro(4.5)decane hydrochloride melting at 264° to 266° C. with decomposition;

(12) 8-(1,4-benzodioxan-2-ylmethyl)-3-oxo-1-thia-4,8-diazaspiro(4.5)decane 1,1-dioxide hydrogen maleate melting at 178° to 179° C.;

(13) 8-(1,4-benzodioxan-2-ylmethyl)-4-p-chlorophenyl-3-oxo-1-thia-4,8-diazaspiro(4.5)decane melting at 217° to 220° C., and its hydrochloride containing ½ molecule of water of crystallization melting at 268° to 271° C. with decomposition;

(14) 8-(6-methyl-1,4-benzodioxan-2-ylmethyl)-3-oxo-1-thia-4,8-diazaspiro(4.5)decane melting at 194° to 195° C., and its hydrogen maleate melting at 184° to 188° C.;

(15) 8-(7-chloro-1,4-benzodioxan-2-ylmethyl)-3-oxo-1-thia-4,8-diazaspiro(4.5)decane melting at 214° to 216° C.;

(16) 8-(2-(1,4-benzodioxan-2-yl)ethyl)-3-oxo-1-thia-4,8-diazaspiro(4.5)decane melting at 177° to 179° C.;

(17) 8-(2-(1,4-bendodioxan-2-yl)acetyl)-3-oxo-4-p-tolyl-1-thia-4,8-diazaspiro(4.5)decane melting at 199° to 201° C.;

(18) 8 - (1,4-benzodioxan-2-ylmethyl)-4-ethyl-3-oxo-1-thia-4,8-diazaspiro(4.5)decane hydrochloride melting at 243° to 246° C. with decomposition;

(19) 8-(1,4-benzodioxan-2-ylcarbonyl)-4-methyl-3-oxo-1-thia-4,8-diazaspiro(4.5)decane melting at 144° to 146° C.;

(20) 8 - (2-(1,4-benzodioxan-2-yl)ethyl)-4-methyl-3-oxo-1-thia-4,8-diazaspiro(4.5)decane hydrochloride melting at 263° to 267° C. with decomposition;

(21) 8 - (2-(1,4-benzodioxan-2-yl)acetyl)-4-methyl-3-oxo-1-thia-4,8-diazaspiro(4.5)decane melting at 124° C.

(22) 8 - (2-(1,4-benzodioxan-2-yl)-2-hydroxyethyl)-3-oxo-1-thia-4,8-diazaspiro(4.5)decane hydrogen maleate melting at 195° to 197° C.;

(23) 8 - (2-(1,4-benzodioxan-2-yl)-2-hydroxyethyl)-4-methyl - 3 - oxo - 1-thia-4,8-diazaspiro(4.5)decane hydrochloride melting at 247° to 249° C.;

(24) 8 - (2-(1,4-benzodioxan-2-yl)-2-hydroxyethyl)-3-oxo-4-p-tolyl-1-thia-4,8-diazaspiro(4.5)decane hydrochloride melting at 210° to 212° C.;

(25) 8 - (2 - (1,4-benzodioxan-2-yl)-2-hydroxyethyl)-2 - methyl - 3 - oxo-4-phenyl-1-thia-4,8-diazaspiro(4.5)decanehydrogen maleate melting at 196° to 198° C.

(26) 8 - [2-(1,4-benzodioxan-2-yl)-2-hydroxyethyl]-4-p-chlorophenyl-3-oxo-1-thia-4,8-diazaspiro[4.5]decane hydrogen maleate melting at 210° to 211° C.

(27) 8 - [2-(1,4-benzodioxan-2-yl)-2-hydroxyethyl]-2-methyl-3-oxo-4-phenyl-1-thia-4,8-diazaspiro[4.5]decane-1,1-dioxide hydrogen maleate melting at 165° to 168° C.;

(28) 8 - [2-(1,4-benzodioxan-2-yl)-2-hydroxyethyl]-2-methyl - 3-oxo-4-phenyl-1-thia-4,8-diazaspiro[4.5]decane-1-oxide hydrogen oxalate melting at 139° to 142° C. with decomposition.

What is claimed is:

1. A compound of the formula

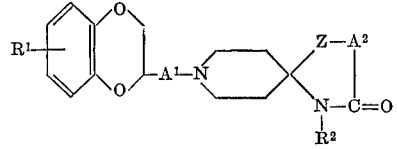

wherein $R^1$ is H, Cl, methyl or methoxy, $R^2$ is H, alkyl of 1 to 4 carbon atoms, benzyl, phenyl or substituted phenyl in which the substituent is selected from the group consisting of Cl, methyl, methoxy and trifluoromethyl, $A^1$ is —$CH_2$—, —$CH_2CH_2$—, —CO—, or —$CH_2CO$— the carbonyl of which is bound to the N atom of the piperidine ring or —CH(OH)—$CH_2$— the methylene (—$CH_2$—) of which is bound to the N atom of the piperidine ring, $A^2$ is —$CH_2$—, or =$CHCH_3$, and Z is —S—, —SO— or —$SO_2$—.

2. A pharmaceutically acceptable acid addition salt of a compound as claimed in claim 1.

3. A compound as claimed in claim 2, wherein the pharmaceutically acceptable acid addition salt is hydrogen maleate.

4. A compound as claimed in claim 2, wherein the pharmaceutically acceptable acid addition salt is hydrochloride.

5. A compound as in claim 1, said compound being 8-(1,4-benzodioxan - 2 - ylmethyl)-3-oxo-1-thia-4,8-diazaspiro(4.5)decane.

6. A compound as in claim 1, said compound being 8-(1,4-benzodioxan - 2 - ylmethyl)-4-ethyl-3-oxo-1-thia-4,8-diazaspiro(4.5)decane.

7. A compound as in claim 1, said compound being 8 - (2 - (1,4-benzodioxan - 2 - yl)ethyl)-3-oxo-1-thia-4,8-diazaspiro(4.5)decane.

8. A compound as in claim 1, said compound being 8 - (1,4-benzodioxan-2-ylmethyl)-2-methyl-3-oxo-4-phenyl-1-thia-4,8-diazaspiro(4.5)decane.

9. A compound as in claim 1, said compound being 8-(2-(1,4-benzodioxan-2-yl)ethyl) - 4 - methyl - 3 - oxo-1-thia-4,8-diazaspiro(4.5)decane.

10. A compound as in claim 1, said compound being 8(1,4-benzodioxan-2-ylmethyl)-2-methyl - 3 - oxo-1-thia-4,8-diazaspiro(4.5)decane.

11. A compound as in claim 1, said compound being 8-(1,4-benzodioxan-2-ylmethyl)-3-oxo - 4 - p-tolyl-1-thia-4,8-diazaspiro(4.5)decane.

12. A compound as in claim 1, said compound being 8(1,4-benzodioxan-2-ylmethyl)-4-methyl - 3 - oxo-1-thia-4,8-diazaspiro(4.5)decane.

13. A compound as in claim 1, said compound being 8 - (8-methoxy-1,4-benzodioxan-2-ylmethyl)-3-oxo-1-thia-4,8-diazaspiro(4.5)decane.

14. A compound as in claim 1, said compound being 8-(1,4-benzodioxan - 2 - ylmethyl)-4-p-methoxyphenyl-3-oxo-1-thia-4,8-diazaspiro(4.5)decane.

15. A compound as in claim 1, said compound being 8-(6-methyl-1,4-benzodioxan-2-ylmethyl)-3-oxo - 1 - thia-4,8-diazaspiro(4.5)decane.

16. A compound as in claim 1, said compound being 8-(1,4-benzodioxan - 2 - ylmethyl)-3-oxo - 4 - m-trifluoromethylphenyl-1-thia-4,8-diazaspiro(4.5)decane.

17. A compound as in claim 1, said compound being 8(1,4-benzodioxan-2-ylmethyl))-4-benzyl-3-oxo - 1 - thia-4,8-diazaspiro(4.5)decane.

18. A compound as in claim 1, said compound being 8-(7-chloro-1,4-benzodioxan - 2 - ylmethyl)-3-oxo-1-thia-4,8-diazaspiro(4.5)decane.

19. A compound as in claim 1, said compound being 8 - (1,4-benzodioxan-2-ylmethyl)-4-p-chlorophenyl-3-oxo-1-thia-4,8-diazaspiro(4.5)decane.

References Cited

Chemical Abstracts, vol. 62: 5264 f, 1965, Tondeur et al.

HENRY R. JILES, Primary Examiner

S. D. WINTERS, Assistant Examiner

U.S. Cl. X.R.

260—340.3 294.7, 526; 424—267